United States Patent [19]

Gierenz et al.

[11] Patent Number: 5,371,131
[45] Date of Patent: Dec. 6, 1994

[54] ADHESIVE STICK HAVING IMPROVED ADHESIVE STRENGTH

[75] Inventors: Gerhard Gierenz, Solingen; Wolfgang Klauck, Meerbusch; Rainer Hoefer, Duesseldorf; Roland Gruetzmacher, Wuelfrath, all of Germany

[73] Assignee: Henkel Kommanditgesellschaft auf Aktien, Germany

[21] Appl. No.: 778,971

[22] PCT Filed: Jun. 21, 1990

[86] PCT No.: PCT/EP90/00982

§ 371 Date: Feb. 19, 1992

§ 102(e) Date: Feb. 19, 1992

[87] PCT Pub. No.: WO91/00322

PCT Pub. Date: Jan. 10, 1991

[30] Foreign Application Priority Data

Jun. 30, 1989 [DE]  Germany .............. 3921554

[51] Int. Cl.$^5$ .................. C08K 5/04; C08K 5/05
[52] U.S. Cl. ...................... 524/394; 524/388; 524/390
[58] Field of Search ............. 524/394, 390, 388

[56] References Cited

U.S. PATENT DOCUMENTS

| | | | |
|---|---|---|---|
| 3,576,776 | 4/1971 | Muszik et al. | 524/388 |
| 4,011,311 | 3/1977 | Noomen et al. | 524/394 |
| 4,292,229 | 9/1981 | Hechenberger et al. | 524/376 X |
| 4,325,855 | 4/1982 | Dickmann et al. | 524/219 |
| 4,384,064 | 5/1983 | Trotter et al. | 524/369 |
| 4,716,189 | 12/1987 | Gollub et al. | 524/394 X |
| 4,857,565 | 8/1989 | Henning et al. | 524/591 X |

FOREIGN PATENT DOCUMENTS 1058339  2/1967  United Kingdom .
1076688  7/1967  United Kingdom .

*Primary Examiner*—George F. Lesmes
*Assistant Examiner*—B. Copenheaver
*Attorney, Agent, or Firm*—Ernest G. Szoke; Wayne C. Jaeschke; Real J. Grandmaison

[57] ABSTRACT

The invention addressed the problem of improving the adhesive strength of a dimensionally stable, soft-rubbing adhesive stick consisting of an aqueous preparation of a synthetic polymer and a soap gel as gel-forming component and, optionally, other auxiliaries. This problem was solved by the use of an at least substantially solvent-free aqueous polyurethane dispersion as the aqueous preparation of a synthetic polymer.

17 Claims, No Drawings

ADHESIVE STICK HAVING IMPROVED ADHESIVE STRENGTH

BACKGROUND OF THE INVENTION

1. Field of the Invention

Stick-form rigid adhesives, which are slidably mounted in a recloseable tube and which leave behind a tacky film when rubbed onto a receiving surface, have become part of everyday life. They contain in particular (cf. DE-PS 18 11 466) water-soluble or water-dispersible synthetic high polymers of adhesive character, particularly polyvinyl pyrrolidone (PVP) dissolved in an aqueous organic liquid phase together with a gel-forming component. The gel-forming components used include, in particular alkali or ammonium salts of aliphatic carboxylic acids, particularly those containing from about 12 to 22 carbon atoms. If the basically highly tacky aqueous preparations of the polymers of adhesive character are heated to relatively high temperatures, particularly above 60° C., together with small quantities of the gel-forming component and if the solution is then allowed to cool at rest, the mixture solidifies into a more or less stiff soap gel in which the stiffening and comparatively rigid micelle structure of these soap gels is initially apparent to a predominant degree. This enables compositions of the type in question to be formed and handled in stick form in recloseable tubes. When rubbed onto a receiving surface, the micelle structure is destroyed so that the rigid composition is converted into a paste in which the adhesive character of the mixture then predominates.

2. Discussion of Related Art

Numerous attempts have been made to modify adhesive sticks of this type by modifying the gel-forming component and/or by modifying the solvent-activated adhesive-forming component. DE-AS 22 04 482 uses the reaction product of sorbitol and benzaldehyde as gel-forming component. According to DE-OS 26 20 721, salts of substituted terephthalic acid amides are used as gelling agents. According to DE-OS 20 54 503, free long-chain aliphatic acids or esters thereof rather than alkali metal salts of aliphatic carboxylic acids are said to represent the gel-forming component. DE-OS 22 19 697 seeks to improve adhesive sticks of the type in question by incorporating anionic, non-soapy wetting agents in the stick, particularly with a view to improving its rubbing on the substrate. According to DE-OS 24 19 067, a reaction product of aromatic diisocyanates with mono- and/or dialkanolamines is said to be used as the gel-forming component.

Despite all these proposals, the oldest form of adhesive sticks of the type in question here based on soap gels, which are described in DE-PS 18 11 466 cited at the beginning, remains by far the most widely used. A solution of PVP in an aqueous organic solvent mixture is converted into the form of the soft-rubbing adhesive stick by incorporation of alkali soaps of aliphatic carboxylic acids.

German patent application DE 36 06 382 describes an improved adhesive stick which additionally contains a limited quantity of lactams of lower aminocarboxylic acids and/or the corresponding ring-opened aminocarboxylic acids to improve its soft rubbing characteristics.

Although the adhesive sticks mentioned above have sufficient strength for glueing paper, there is still a need for adhesive sticks which can be universally used and with which relatively high-strength glueing can be carried out. More particularly, the glueing of paper with the sticks should not deteriorate under adverse climatic conditions.

Another disadvantage of known adhesive sticks is that, before formation of the soap gel, the stick composition is highly viscous in the heated state which results in bubble formation and also complicates processing in other respects.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the problem addressed by the present invention was to provide an adhesive stick improved in this regard which is based on an aqueous polyurethane dispersion and which is suitable for relatively high-strength glueing. Another particular problem addressed by the invention was to provide an adhesive stick of the type in question which could be formulated without any need for water-soluble plasticizers or organic solvents.

Accordingly, the present invention relates to a dimensionally stable, soft-rubbing adhesive stick consisting of an aqueous preparation of a synthetic polymer and a soap gel as gel-forming component and, optionally, other auxiliaries, characterized in that an at least substantially solvent-free aqueous polyurethane dispersion is present as the aqueous preparation of a synthetic polymer.

The adhesive sticks according to the invention thus contain an aqueous polyurethane dispersion as the adhesive polymer component. In the context of the invention, polyurethane dispersions are understood quite generally to be reaction products of, on the one hand, polyfunctional alcohols, aminoalcohols or amines with, on the other hand, polyfunctional isocyanates hand which either contain structural elements additionally reacted into the chain that are capable of forming ionic groups after neutralization and, in addition to or instead of such groups, contain hydrophilic nonionic constituents so that the polymers are self-dispersing on addition of water. According to the invention, particularly finely divided polyurethane dispersions are preferred starting materials for adhesive sticks which are opaque or translucent to transparent in appearance and in which the polymers should be at least partly present in solution. The specialist knowledge of the expert on polyurethanes can be applied in this regard to influence fineness through the percentage content of ionic and/or nonionic constituents.

The polyurethane dispersions used as synthetic polymers in the adhesive sticks contain a co-reacted polyol or polyol mixture as starting product. In general terms, these polyols should contain at least two reactive hydrogen atoms and should be substantially linear. Their molecular weight is in the range from 300 to 40,000 and preferably in the range from 500 to 6,000. Suitable polyols are polyester polyols, polyacetal polyols, polyether polyols, polythioether polyols, polyamidopolyols or polyesteramide polyols each containing 2 to 4 hydroxy groups which may even be partly replaced by amino groups.

In addition, monofunctional alcohols, particularly ether alcohols, may also be used as nonionic hydrophilic modifying agents. Reaction products of $C_{1-10}$ alcohols with ethylene oxide having a molecular weight of up to 20,000 and preferably in the range from 200 to 6,000 are preferably used for this purpose.

Suitable polyethers are, for example, the polymerization products of ethylene oxide, propylene oxide, butylene oxide and copolymerization or graft polymerization products thereof and also the polyethers obtained by condensation of polyhydric alcohols or mixtures thereof and the polyethers obtained by alkoxylation of polyhydric alcohols, amines, polyamines and amino alcohols. Isotactic polypropylene glycol may also be used.

The preferred polyether polyol is polytetrahydrofuran. In the context of the invention, the term polytetrahydrofuran applies to polyethers which may be theoretically or actually prepared by ring-opening polymerization of tetrahydrofuran and which contain a hydroxyl group at either end of the chain. Suitable products of this type have a degree of oligomerization of from about 1.5 to 150 and preferably from 5 to 100.

Another preferred class of polyols are polycarbonate polyols, of which aliphatic polycarbonate polyols, i.e. esters of carbonic acid with difunctional $C_{2-10}$ alcohols, are preferred. Polycarbonate polyols based on carbonic acid and bisphenol A are less suitable.

Suitable polyacetals are, for example, the compounds obtainable from glycols, such as diethylene glycol, triethylene glycol, 4,4'-dioxethoxydiphenyl dimethyl methane, hexanediol and formaldehyde. Suitable polyacetals can also be obtained by polymerization of cyclic acetals.

Among the polythioethers, condensates of thiodiglycol on its own and/or with other glycols, dicarboxylic acids, formaldehyde, aminocarboxylic acids or amino alcohols are mentioned in particular. Depending on the co-components, the products are polythioethers, polythio mixed ethers, polythioether esters, polythioether esteramides. Polyhydroxyl compounds such as these may also be used in alkylated form or in admixture with alkylating agents.

The polyesters, polyester amides and polyamides include the predominantly linear condensates obtained from polybasic, saturated and unsaturated carboxylic acids or anhydrides thereof and polyhydric, saturated and unsaturated alcohols, aminoalcohols, diamines, polyamines and mixtures thereof and also, for example, polyterephthalates or polycarbonates. Polyesters of lactones, for example caprolactone, or hydroxycarboxylic acids may also be used. The polyesters may be terminated by hydroxyl or carboxyl groups. Other suitable alcohol (co)components for their synthesis are relatively high molecular weight polymers or condensates, such as for example polyethers, polyacetals, polyoxymethylenes.

Polyhydroxyl compounds already containing urethane or urea groups and optionally modified natural polyols, such as castor oil, may also be used. It is also possible in principle to use polyhydroxyl compounds containing basic nitrogen atoms, for example polyalkoxylated primary amines or polyesters or polythioethers containing co-condensed alkyl diethanolamine. Polyols obtainable by complete or partial ring opening of epoxidized triglycerides containing primary or secondary hydroxyl compounds, for example the reaction product of epoxidized soybean oil with methanol, may also be used.

Suitable polyisocyanates for the PU dispersions according to the invention are any aromatic and aliphatic diisocyanates such as, for example, 1,5-naphthylene diisocyanate, 4,4'-diphenyl methane diisocyanate, 4,4'-diphenyl dimethyl methane diisocyanate, di- and tetra-alkyl diphenyl methane diisocyanate, 4,4'-dibenzyl diisocyanate, 1,3-phenylene diisocyanate, 1,4-phenylene diisocyanate, the isomers of tolylene diisocyanate, optionally in admixture, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate, dicyclohexyl methane diisocyanate, cyclohexane-1,4-diisocyanate, ethylene diisocyanate, phthalic acid bis-isocyanatoethyl ester; also polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,2-diisocyanatododecane and dimeric fatty acid diisocyanate. The isocyanates mentioned above may be used individually or even in admixture. Cyclic or branched aliphatic diisocyanates, such as isophorone diisocyanate, and also hexamethylene diisocyanate are preferred. Among the aromatic diisocyanates, tetramethyl xylene diisocyanate (TMXDI) is preferred. Chain-extending agents containing reactive hydrogen may also be used in the production of the polyurethane dispersions used in accordance with the invention. Chain-extending agents containing reactive hydrogen atoms include:

the usual saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxy hydroquinone, terephthalic acid bis-glycol ester, succinic acid di-2-hydroxyethyl amide, succinic acid di-N-methyl-(2-hydroxyethyl)-amide, 1,4-di-(2-hydroxymethylmercapto)-2,3,5,6-tetrachlorobenzene, 2-methylenepropane-1,3-diol, 2-methylpropane-1,3-diol;

aliphatic, cycloaliphatic and aromatic diamines, such as ethylenediamine, hexamethylenediamine, 1,4-cyclohexylenediamine, benzidine, diaminodiphenylmethane, dichlorodiaminodiphenylmethane, the isomers of phenylenediamine, hydrazine, ammonia, carbohydrazide, adipic acid dihydrazide, sebacic acid dihydrazide, piperazine, N-methyl propylenediamine, diaminodiphenyl sulfone, diaminodiphenyl ether, diaminodiphenyl dimethyl methane, 2,4-diamino-6-phenyltriazine;

aminoalcohols, such as ethanolamine, propanolamine, butanolamine, N-methyl ethanolamine, N-methyl isopropanolamine;

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the someric mono- and diaminonaphthoic acids;

water.

It is emphasized that it is not possible in accordance with the invention strictly to distinguish between the compounds containing reactive hydrogen atoms and having a molecular weight of 300 to 20,000 and the so-called "chain-extending agents" because the transitions between the two classes of compounds are fluid. Compounds which are not made up of several monomer units, but which have a molecular weight above 300, such as 3,3'-dibromo-4,4'-diaminodiphenylmethane, are included among the chain-extending agents, as also is pentaethylene glycol although, on the basis of its composition, it is actually a polyetherdiol.

Special chain-extending containing at least one basic nitrogen atom are, for example, mono-, bis- or polyalkoxylated aliphatic, cycloaliphatic, aromatic or heterocyclic primary amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, C-cyclohexyl diisopropanolamine, N,N-didiethoxyl aniline, N,N-diethoxyl toluidine, N,N-diethoxyl-1-aminopyridine, N,N'-diethoxyl piperazine, dimethyl-bis-ethoxylhydrazine, N,N'-bis-(2-hydroxyethyl)-N,N,-diethyl hexahydro-p-phenylenediamine, N-12-hydroxyethylpiperazine, polyalkoxylated amines, such as propoxylated methyl diethanolamine, also such compounds as N-methyl-N,N-bis-3aminopropylamine, N-(-3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-( 3-aminopropyl)-piperazine, N-(2-aminoethyl)-piperazine, N,N'-bis-oxyethyl propylenediamine, 2,6-diaminopyridine, diethanolaminoacetamide, diethanolamidopropionamide, N,N-bis-oxyethyl phenyl thiosemicarbazide, N,N-bis-oxyethyl methyl semicarbazide, p,p'-bis-aminomethyl dibenzyl methylamine, 2,6-diaminopyridine, 2-dimethylaminomethyl-2-methylpropane-1,3-diol.

In addition, the polyurethanes on which the polyurethane dispersions used in accordance with the invention are based contain a functional component capable of salt formation in aqueous solution as an important constituent. Dihydroxy compounds or even diamino compounds containing an ionizable carboxylic acid, sulfonic acid or ammonium group are suitable for this purpose. These compounds may be used either as such or may be prepared in situ. To introduce compounds containing ionizable carboxylic acid groups into the polyurethane, dihydroxycarboxylic acids may be added to the polyols. Dimethylolpropionic acid is one example of a preferred dihydroxycarboxylic acid.

To introduce sulfonic acid groups capable of salt formation, a diaminosulfonic acid may be added to the polyols. Examples are 2,4-diaminobenzenesulfonic acid and also the N-(w-aminoalkane)-w'-aminoalkanesulfonic acids described in DE 20 35 732.

According to the invention, the polyurethane prepolymers to be used are preferably made soluble in water by introduction of carboxylic acid or sulfonic acid groups; the nonionic modifying agents already mentioned, i.e. for example ether alcohols or derivatives thereof, may also be used in conjunction with or instead of the anionic modifying agents.

Where they are anionically modified, the polymers are present in salt form in the polyurethane dispersions used in accordance with the invention. In the preferred polymers modified with carboxylic acids or sulfonic acids, alkali metal salts, ammonia or amines, i.e. primary, secondary or tertiary amines, are present as counterions.

According to the invention, the neutralizing agents are preferably used in a stoichiometric ratio, based on the acid groups, or in excess.

Accordingly, the groups capable of salt formation may be completely or partly neutralized by the counterions. An excess of neutralizing agents may also be used.

To produce the polyurethanes particularly suitable for the purposes of the invention, the polyols and an excess of diisocyanate are reacted to form an isocyanate-terminated prepolymer; suitable reaction conditions and reaction times and temperatures may be varied according to the particular isocyanate. Experts know that the reactivity of the constituents to be reacted necessitates a suitable balance between reaction velocity and unwanted secondary reactions which result in discoloration and a reduction in molecular weight. The reaction is typically carried out with stirring over a period of approximately 1 to 6 hours at approximately 50° to approximately 120° C.

The preferred production process is the so-called acetone process (D. Dietrich, Angew. Makromol. Chem. 98, 133 (1981)). The polyurethane dispersions used in accordance with the invention may also be produced by the process according to DE 15 95 602. A more recent process for the production of polyurethane dispersions is described in DE 36 03 996 and in the prior art cited therein, namely: DE-PS 8 80 485, DE-AS 10 44 404, U.S. Pat. No. 3,036,998, DE-PS 11 78 86, DE-PS 11 84 946, DE-AS 12 37 306, DE-AS 14 95 745, DE-OS 15 95 602, DE-OS 17 70 068, DE-OS 20 19 324, DE-OS 20 35 32, DE-OS 24 46 440, DE-OS 23 45 256, DE-OS 24 27 274, U.S. Pat. No. 3,479,310 and Angewandte Chemie 82,53 (1970) and Angew. Makromol. Chem. 26, 85 et seq. (1972).

Of the processes mentioned, the "acetone process" corresponding to the teaching of DE-OS 14 95 745 (=U.S. Pat. No. 3,479,310) or to DE-OS 14 95 847 (GB-PS 1,067,788) is of particular importance. In this process, an NCO-terminated prepolymer is generally prepared first in an inert solvent, followed by chain extension in solution to form the relatively high molecular weight polyurethane. The hydrophilic groups required for dispersion are preferably incorporated either by incorporation of diols bearing ionic, potentially ionic or nonionic hydrophilic groups in the polymer or by using corresponding amines as chain-extending agents. Dispersion is carried out in batches in stirred tanks equipped with a stirrer and optionally baffles. The solvent used is generally distilled off from the stirred tank immediately after dispersion in water.

Other processes for the production of polyurethane prepolymers, more particularly for the continuous production of polyurethane prepolymers, are described in DE-OSS 22 60 870, 23 11 635 and 23 44 135.

However, the polyurethane dispersions used in the adhesive sticks according to the invention may also be produced in the absence of acetone as solvent. The starting materials used in this case are the polyols based on polytetrahydrofuran or copolymers thereof with ethylene oxide or propylene oxide which are preferably used for the purposes of the invention, low molecular weight polyols, for example those having a molecular weight of up to 2,000 or up to 1,000, preferably being used. The polyols are then reacted in the presence of a polyol bearing acid groups, i.e. for example dimethyl propionic acid, in an OH:NCO ratio of greater than 1:1.2 until stirrable resins are formed and the resins thus formed may then be directly dispersed in water.

According to the invention, it is preferred to use polyurethane dispersions which are clear to opaque.

To obtain substantially clear, i.e. transparent, opaque to water-clear polyurethane dispersions, the expert has to establish a certain ratio between the component capable of salt formation and the other polyurethane-forming components. Thus, it is best to use the component capable of salt formation, expressed as dimethylolpropionic acid, in quantities of 1 to 30% by weight, preferably in quantities of 2 to 20% by weight and more preferably in quantities of 10 to 18% by weight based on polyol. Based on polyurethane solids and expressed as dimethylolpropionic acid, these quantities are 5 to 35% by weight, preferably 5 to 20% by weight and more preferably 5 to 15% by weight. In addition, transparency depends on the degree of neutralization. By conducting a few preliminary tests, the expert can determine the quantity of modifying agent capable of ion formation beyond which or the quantity of neutralizing agent beyond which an adequate degree of transparency is obtained. In general, as little of these substances as possible will be used because, if used in excessive quantities, they can adversely affect the resistance of the adhesive film to water.

In addition to or instead of modification with components capable of salt formation, nonionic modification may also be applied. Monoalcohols obtained by reaction of primary alcohols with ethylene oxide are particularly suitable for nonionic modification. The necessary quantity of nonionic modifying agents depends on the hydrophilic character of the system as a whole, i.e. it is smaller when polyols based on polyethylene glycol have already been used as polyols in the synthesis of the polymer. The quantity is of course also smaller when ionic groups are additionally incorporated. The upper limit is imposed by the resistance of the adhesive film to water. For example, up to 85% by weight of the polyurethane, based on solids, may be derived from ethylene oxide. In the absence of ionic modification, typical values are 5 to 50% by weight. Where ionic modifying agents are used, however, lower values may be established.

An important factor in the production of the polyurethane-dispersions on which the adhesive sticks according to the invention are based is the ratio of hydroxyl groups to isocyanate groups which may be between 1.0:0.8 and 1.0:4.0. Preferred ratios are from 1.0:1.1 to 1.0:2.0, ratios of 1.0:1.1 to 1.0:1.8 being particularly preferred. Corresponding polyurethane dispersions may be prepared in a wide concentration range. Preparations having a solids content of 20 to 80% by weight are preferred, preparations having a solids content of 35 to 60% by weight being particularly preferred.

The adhesive sticks according to the invention contain sodium salts of $C_{12-20}$ fatty acids of natural or synthetic origin as soaps for forming the gel structure. $C_{12-18}$ fatty acid mixtures are preferred. The sodium salts of the fatty acids, i.e. the soaps, are present in quantities of 3 to 20% by weight and preferably in quantities of 5 to 12% by weight, based on the adhesive stick composition.

The auxiliaries typically encountered in adhesive sticks may be used in the adhesive sticks according to the invention. According to the invention, however, it is preferred not to use plasticizers and/or moisture regulators, i.e. organic water-soluble solvents, which are normally used in adhesive sticks, although these compounds may optionally be present in small amounts. The auxiliaries in question are polyglycol ethers, more especially polyethylene glycol and polypropylene glycol, the preferred polyethers having an average molecular weight in the range from 200 to 1,000 and more especially in the range from 500 to 800. Polyfunctional alcohols, such as glycerol, trimethylolpropane and the like, and/or polyether glycols may also be used. For example, a mixture of glycerol and polyethylene glycol may optionally be used. The non-volatile organic solvents mentioned should be used at most in quantities of up to 50% by weight, based on the water content of the sticks.

In addition to the principal components mentioned here, typical auxiliaries, for example substances which promote easy and soft rubbing, may also be used. Such substances are, for example, aminocarboxylic acids and/or lactams thereof. Suitable aminocarboxylic acids and lactams thereof should contain up to 12 carbon atoms and more especially from 4 to 8 carbon atoms. The preferred representative for practical use is $\epsilon$-caprolactam or the 7-aminocaproic acid derived therefrom. The quantity in which the lactams or the corresponding aminocarboxylic acids are used is, typically, no more than 15% by weight and, for example, from 2.5 to 15% by weight, based on the stick composition as a whole.

The adhesive sticks according to the invention may contain pigments, dyes, odor enhancers and the like as further auxiliaries. The quantities in which these auxiliaries are present are, as usual, small. Other possible additives are, for example, fillers, dextrins, cellulose derivatives, starch derivatives.

The mixture is processed in known manner from the mixtures of the polyurethane dispersions, the soap component and optionally the other auxiliaries heated to temperatures of 60° C. and preferably above 80° C. These mixtures, which are readily pourable, are preferably packed directly in stick tubes or similar containers and left to solidify to the desired gels without any mechanical assistance.

The adhesive sticks according to the invention have the advantage of relatively high adhesive strength and may therefore be used not only for glueing paper. In addition, they may even be prepared, if desired, without the use of water-soluble plasticizers (water-soluble organic solvents) or moisture regulators (likewise water-soluble organic solvents). Adhesive sticks according to the invention show significantly lower intrinsic tackiness in a humid atmosphere (for example 30° C./75% relative humidity) and, hence, can also be handled more cleanly under these conditions.

EXAMPLES

Example 1

Production of the Polyurethane Solutions or Dispersions

The polyurethane adhesive raw materials are produced by the acetone process, although they may also be produced by other processes, including for example dispersion of the extruded prepolymer melt (melt extrusion process). Polyisocyanates and diol components (polyetherdiol and dimethylolpropionic acid) are initially introduced in acetone and stirred under reflux at approximately 65° to 80° C. until the NCO value is constant. On completion of the reaction, the quantity of water shown, which contains the calculated quantities of alkali and optionally chain extender, is added with vigorous stirring. The application of intense shear forces is of considerable importance to the quality and especially to the homogeneity of the dispersion. After stirring for several hours, the solvent is distilled off until the acetone concentration is distinctly below 0.1 and until the viscosities and solids contents shown in Table I have been reached.

weight approx. 700,000), 8% by weight sodium myristate, 6% by weight glycerol, 9% by weight propylene glycol 600 and 51% by weight water at 75° C. and similarly introducing the resulting mixture into stick tubes to cool. In comparison stick 12, the glycerol and polypropylene glycol are replaced by water.

TABLE II

| Stick No. | 1 | 2 | 3 | 4 | 5 | 6 | 7 | 8 | 9 | 10 | 11 | 12 |
|---|---|---|---|---|---|---|---|---|---|---|---|---|
| Parts by wt. Dispersion A | 93 | 82 | / | / | / | / | / | / | 40 | 35 | / | / |
| Parts by wt. Dispersion B | / | / | 93.5 | 83 | / | / | / | / | / | / | / | / |
| Parts by wt. Dispersion C | / | / | / | / | 90 | 85 | / | / | 50 | 45 | / | / |
| Parts by wt. Dispersion D | / | / | / | / | / | / | 90 | 82 | / | / | / | / |
| PVP | / | / | / | / | / | / | / | / | / | / | 26 | 26 |
| Parts by wt. Water | / | 1 | / | / | 3 | / | 4 | 2 | 3 | / | 51 | 66 |
| Parts by wt. Glycerol | / | 7 | / | 6 | / | 4 | / | 7 | / | 6 | 6 | / |
| Parts by wt. PPG 600 | / | 3 | / | 4 | / | 5 | / | 3 | / | 8 | 9 | / |
| Parts by wt. Na myristate | / | 1 | / | / | 7 | 6 | / | / | / | / | 8 | 8 |
| Parts by wt. Na palmitate | 3 | 3 | 2.5 | 3 | / | / | 3 | 3 | 3 | 3 | / | / |
| Parts by wt. Na stearate | 4 | 3 | 4 | 4 | / | / | 3 | 3 | 4 | 4 | / | / |
| Open time (mins)* | 0.7 | 3.0 | 0.8 | 2.5 | 1.0 | 3.5 | 0.7 | 3.5 | 0.8 | 2.5 | 3.5 | |
| Softness of rubbing | Good | Very good | Good | Very good | Good | Very good | Good | Very good | Good | Very good | Very good | System too viscous and cannot be introduced into stick tubes, even at 95° C. |
| Tensile Shear strength** (N/mm²) | | | | | | | | | | | | |
| Wood/Wood | 6.1 | 2.0 | 5.7 | 2.0 | 6.0 | 1.8 | 5.0 | 1.7 | 6.5 | 2.0 | 1.4 | |
| Wood/PVC | 3.4 | 0.5 | 3.5 | 0.4 | 0.9 | 0.4 | 1.0 | 0.5 | 2.5 | 0.8 | 0.2 | |
| Wood/ABS | 2.0 | 0.4 | 2.0 | 0.3 | 1.0 | 0.3 | 0.5 | 0.4 | 1.5 | 0.6 | 0.3 | |
| Wood/Alu | 1.4 | 0.7 | 2.0 | 0.6 | 1.5 | 0.9 | 1.8 | 1.0 | 1.4 | 1.0 | 0.5 | |
| Viscosity at 60° C. (mpas) | 3400 | 2900 | 3300 | 3000 | 3600 | 3000 | 2600 | 2400 | 3800 | 3200 | 9000 | not measurable |

*Maximum time to paper tearing after two applications to typing paper
**Three applications on both sides, tearing after three days measured in accordance with DIN 53 254

TABLE I

| Polyurethane System No. | A | B | C | D |
|---|---|---|---|---|
| Parts by wt. Water | 233 | 230 | 200 | 200 |
| Parts by wt. Isophorone diisocyanate | 49 | — | 58.4 | 29.7 |
| Parts by wt. Trimethyl hexamethylene diisocyanate | — | 49.5 | — | — |
| Parts by wt. PTHF 2000* | 100 | 90 | — | — |
| Parts by wt. Polyurax PPG 1025** | — | 10 | 100 | — |
| Parts by wt. Pluronic L 61*** | — | — | — | 100 |
| Parts by wt. Dimethylolpropionic acid | 15.6 | 15.6 | 13 | 6.8 |
| Parts by wt. NaOH (100%) | 4.7 | 3.5 | 4.1 | 2.2 |
| Parts by wt. NH, (100%) | — | 0.5 | — | — |
| Parts by wt. Acetone | 50 | 60 | 50 | 50 |
| Solids content after distillation (%) | 46 | 47 | 41 | 36 |
| Viscosity at 20° C. after distillation (mPas) | 4000 | 3800 | 14000 | 12000 |

*Polytetrahydrofuran $M_w$ = 2000 (BASF)
**Polypropylene glycol $M_w$ = 1000 (BP)
***Polyethylene propylene glycol (EO content 10%) $M_w$ = 2000 (BASF)

Example 2

Production of the Stick Compositions

Stick compositions 1 to 10 are obtained by mixing of the individual components shown in Table II at 65° to 80° C. and subsequently introducing the resulting mixtures into stick tubes to cool; if necessary, the pH value of the composition is adjusted to pH 8–11 by addition of a little dilute sodium hydroxide. Comparison stick 11 is prepared by mixing 26% by weight PVP (molecular

We claim:

1. A dimensionally stable, soft-rubbing adhesive stick consisting essentially of an aqueous preparation of a synthetic polymer and from 3 to 20% by weight, based on the weight of said stick, of a soap selected from the group consisting of sodium salts of $C_{12-20}$ fatty acids as a gel-forming component, said aqueous preparation being substantially free of organic solvent, and said polymer comprising a polyurethane dispersion, said polyurethane dispersion comprising the reaction product of a polyfunctional compound selected from the group consisting of an alcohol, aminoalcohol, and amine with a polyfunctional isocyanate selected from the group consisting of one which contains a structural component reacted into the chain which is capable of forming an ionic group after neutralization, one which contains a nonionic hydrophilic constituent, and one which contains both, wherein the ratio of hydroxyl or amine groups to isocyanate groups is between 1.0:0.8 and 1.0:4.0, so that said reaction product is self-dispersing on the addition of water thereto.

2. An adhesive stick as in claim 1 wherein said polyurethane dispersion contains a coreacted polyol or polyol mixture as a starting material, said polyol being substantially linear and containing at least 2 reactive hydrogen atoms and having a molecular weight from 300 to 40,000.

3. An adhesive stick as in claim 2 wherein said polyol is selected from the group consisting of polyester polyols, polyacetal polyols, polyether polyols, polythioether polyols, polyamido polyols, and polyesteramide polyols, each of said polyols containing from 2 to 4 hydroxy groups.

4. An adhesive stick as in claim 1 wherein said nonionic hydrophilic constituent comprises the reaction product of a $C_1$–$C_{10}$ alcohol with ethylene oxide having a molecular weight of up to about 20,000.

5. An adhesive stick as in claim 1 wherein said polyfunctional compound is selected from the group consisting of a polymerization product of ethylene oxide, propylene oxide or butylene oxide; a condensation product of a polyhydric alcohol; and an alkoxylation product of a polyhydric alcohol, amine, polyamine, aminoalcohol, or polytetrahydrofuran.

6. An adhesive stick as in claim 1 wherein said polyurethane dispersion contains a reaction product of a polycarbonate polyol.

7. An adhesive stick as in claim 1 wherein said polyurethane dispersion contains a chain-extending agent having a reactive hydrogen atom.

8. An adhesive stick as in claim 7 wherein said chain-extending agent is selected from the group consisting of a glycol, diamine, aminoalcohol, and aminocarboxylic acid.

9. An adhesive stick as in claim 1 wherein said polyurethane dispersion contains the reaction product of a polyol mixture, a functional component capable of salt formation in alkaline solution and a polyisocyanate.

10. An adhesive stick as in claim 9 wherein said component capable of salt formation is selected from the group consisting of a dihydroxy compound and a diamino compound containing an ionizable carboxylic acid, sulfonic acid and ammonium group.

11. An adhesive stick as in claim 9 wherein said component capable of salt formation, expressed as dimethylolpropionic acid, is present in an amount of from about 5 to about 35% by weight, based on the weight of the polyurethane solids.

12. An adhesive stick as in claim 1 wherein said isocyanate is selected from the group consisting of aromatic diisocyanates and aliphatic diisocyanates.

13. An adhesive stick as in claim 1 wherein said polyurethane dispersion contains an auxiliary component selected from the group consisting of an aminocarboxylic acid, a lactam of an aminocarboxylic acid, pigment, dye, and odor enhancer.

14. An adhesive stick as in claim 1 wherein said polyurethane dispersion comprises the reaction product of a polyol or polyol mixture, an at least difunctional isocyanate component, and a component capable of salt formation in aqueous alkaline solution or a nonionic hydrophilic agent.

15. The process of producing a dimensionally stable, soft-rubbing adhesive stick, comprising reacting a polyol or polyol mixture bearing acid groups with an excess of a polyfunctional isocyanate until a stirrable polyurethane resin is formed, said polyfunctional isocyanate being selected from the group consisting of one which contains a structural component reacted into the chain which is capable of forming an ionic group after neutralization, one which contains a nonionic hydrophilic constituent, and one which contains both, wherein the ratio of hydroxyl groups to isocyanate groups is between 1.0:0.8 and 1.0:4.0, forming an aqueous dispersion of said polyurethane resin, mixing said aqueous dispersion of polyurethane resin with from 3 to 20% by weight, based on the weight of said stick, of a gel-forming soap selected from the group consisting of sodium salts of $C_{12-20}$ fatty acids, heating the mixture of polyurethane resin and gel-forming soap to a temperature above about 60° C. until a homogeneous mixture thereof is formed, and cooling the mixture without agitation until the mixture has gelled.

16. The process as in claim 15 including adding to said polyurethane resin a chain-extending agent having a reactive hydrogen atom.

17. The process as in claim 15 wherein said polyol is selected from the group consisting of polyester polyols, polyacetal polyols, polyether polyols, polythioether polyols, polyamido polyols, and polyesteramide polyols, each of said polyols containing from 2 to 4 hydroxy groups.

* * * * *